No. 759,286. PATENTED MAY 10, 1904.
M. KALLMANN.
ELECTRICITY METER.
APPLICATION FILED SEPT. 28, 1901.
NO MODEL. 2 SHEETS—SHEET 1.
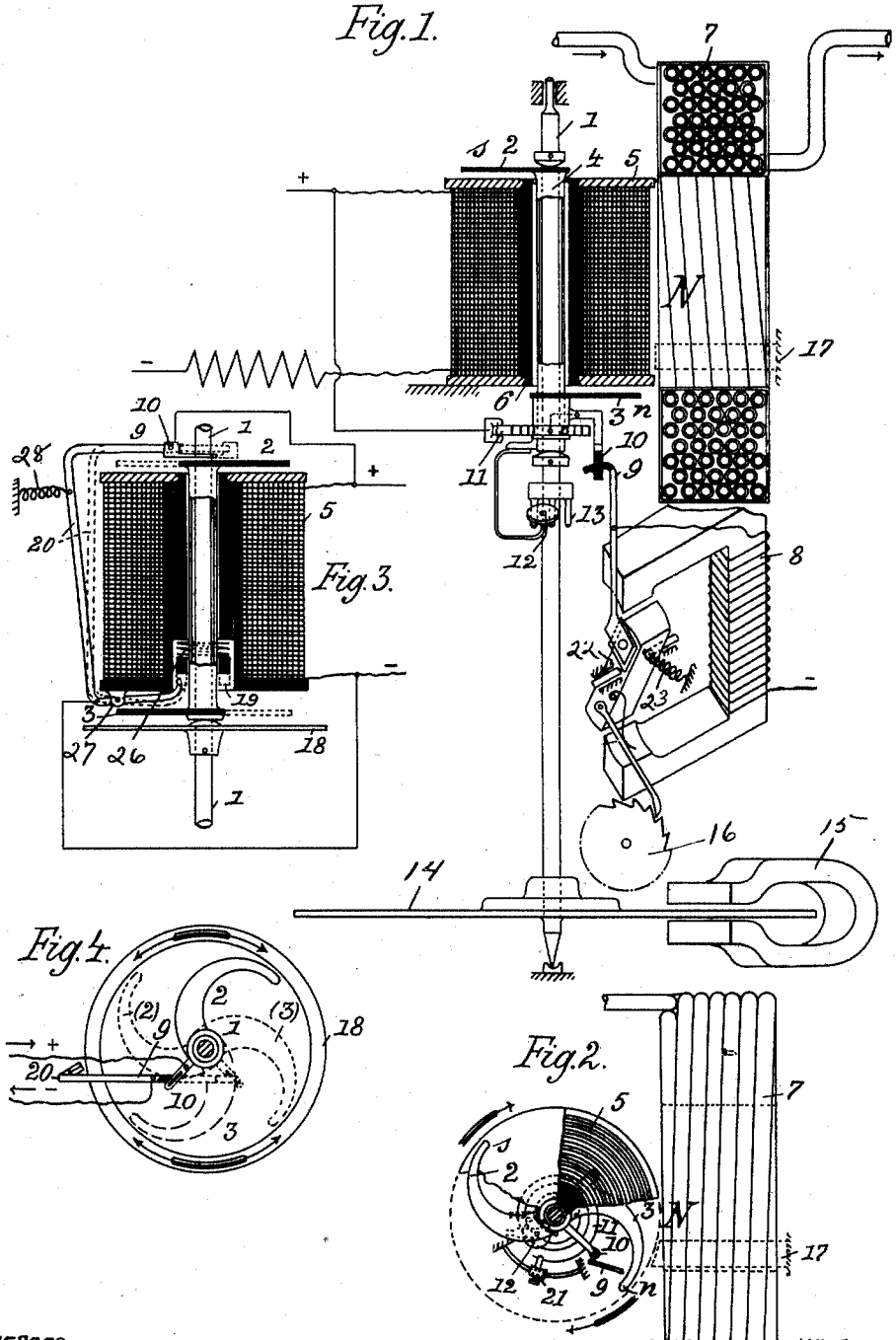

No. 759,286. PATENTED MAY 10, 1904.
M. KALLMANN.
ELECTRICITY METER.
APPLICATION FILED SEPT. 28, 1901.
NO MODEL. 2 SHEETS—SHEET 2.
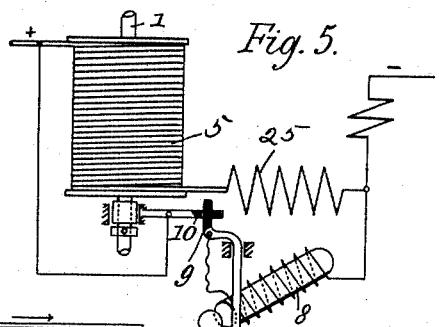
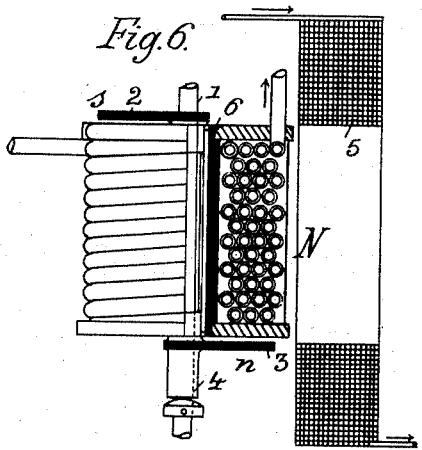
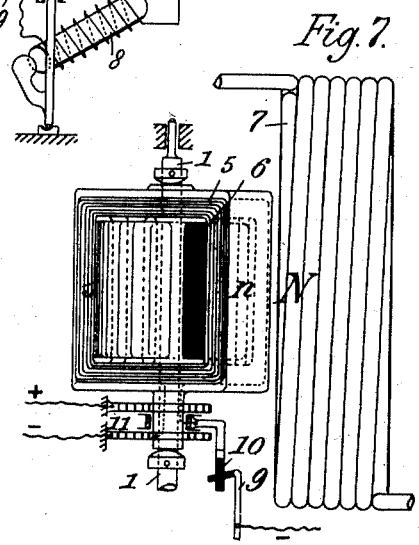
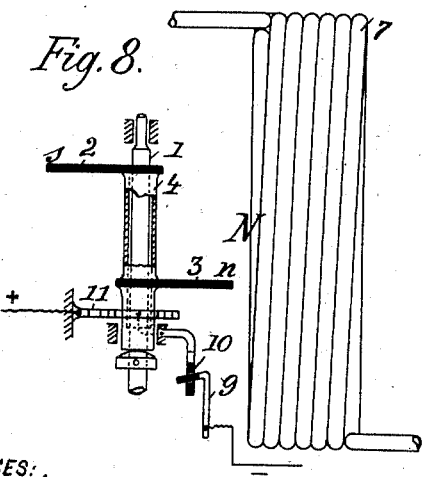
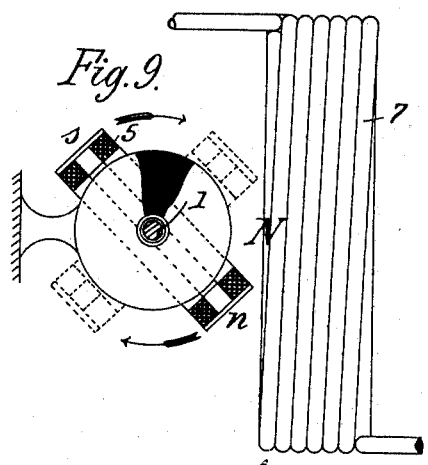
WITNESSES:
Isabella Waldron
Adelaide Claire Gleason
INVENTOR.
Martin Kallmann
BY
Richards & Co.
ATTORNEYS
THE NORRIS PETERS CO., PHOTO-LITHO., WASHINGTON, D. C.

No. 759,286.

Patented May 10, 1904.

UNITED STATES PATENT OFFICE.

MARTIN KALLMANN, OF BERLIN, GERMANY, ASSIGNOR TO INTERNATIONALE ELECTRICITÄTS ZÄHLER GESELLSCHAFT, M. B. H., OF BERLIN, GERMANY.

ELECTRICITY-METER.

SPECIFICATION forming part of Letters Patent No. 759,286, dated May 10, 1904.

Application filed September 28, 1901. Serial No. 76,860. (No model.)

*To all whom it may concern:*

Be it known that I, MARTIN KALLMANN, electrician, of 69 Königgrätzerstrasse, Berlin, S. W., Kingdom of Prussia, Germany, have invented certain new and useful Improvements in Electricity-Meters, of which the following is a full, clear, and exact specification.

The present invention relates to an improved electricity-meter in which an armature deflected by the current has a to-and-fro motion, the deflection being caused to impart a continuous rotation to a brake or retarding device and the return movement of the armature being effected by auxiliary means so quickly that the momentum of the brake device is sufficient to compensate for the lack of power during each movement. In such a meter, as there is no electrical commutation of the motor part, collectors, brushes, and the like are avoided. In order to diminish the mass of the driving part of the motor, an iron armature polarized by the electromagnetic effect of the shunt or series current of the meter may be employed or a permanent magnet or a light potential or shunt coil, which may have its field strengthened by a fixed iron core.

In the accompanying drawings, which illustrate several modifications of this invention, Figures 1 and 2 are front elevation and plan, respectively, partly in section, showing a watt-hour meter having an iron armature polarized by the shunt-field, together with a relay for effecting the return movement of the armature. Figs. 3 and 4 show in section and plan the armature and polarizing shunt-coil, the latter also acting as the relay. Fig. 5 is a diagrammatic view of the circuits of the meter. Figs. 6, 7, and 9 illustrate modifications of the arrangement of shunt and series circuits of the meter shown in Fig. 1, and Fig. 8 shows an ampere-hour meter in which a permanent magnet-armature reciprocates in the main-current field.

In carrying this invention into effect according to the modification shown in Figs. 1 and 2 the current to be measured passes through one or more series coils 7. Arranged in the field of these coils is a light iron armature consisting of two arms 2 and 3, attached to a sleeve 4, working on a spindle 1, to which is fitted an eddy-current brake-disk 14, which revolves in the field of a permanent magnet 15. The sleeve 4 passes axially through a solenoid 5, which is wound on a tubular iron core 6, the arms 2 and 3 of the armature being situated at opposite ends of this solenoid and projecting in opposite directions from its axis. The solenoid 5 is excited in shunt from the supply-circuit and serves to polarize the iron armature. Motion is transmitted from the armature to the brake-disk by means of a roller 12, carried by a spring and engaging with a four-armed spur-wheel 13, which may be composed of pins fixed to a flange on the axle 1. This armature-sleeve has a contact-arm 10 attached to it, which is adapted to engage with a contact-lever 9, secured to a pivoted armature 22 of electromagnetic relay 8. When the meter is in operation, the deflection of the polarized armature 2 3 causes the spring-roller 12 to revolve the brake-disk spindle 1 through engagement with the spur-wheel 13 on the said spindle with a speed proportional to the consumption of energy in the meter-circuit. After a certain predetermined angle—say ninety degrees—has been passed through by the armature 2 3 the contact-arm 10, to which current is conducted by a spiral spring 11, strikes against the lever 9. This excites the relay 8, which then attracts its armature 22 against the force of a spring 23 and quickly throws back the armature 2 3 and sleeve 4, causing the roller 12 to fall between the next two teeth of the four-toothed wheel 13. This operation of coupling and uncoupling the motor-armature and the brake-disk is continually repeated, the armature being thrown back ninety degrees by the relay, while the brake-disk in consequence of its inertia continues its rotation, receiving a fresh impulse each time that the levers 9 and 10 come into contact.

The fixed iron core 6 is provided for the purpose of strengthening the effect of the exciting-coil 5 on the polarized armature.

The registration of the meter is effected by means of the armature 22 of the relay 8, which actuates a pawl and ratchet-wheel 16 with every excitation of the relay. By the sliding movement of the lever 9 against 10 a good contact is insured. The spiral spring 11, which conducts the current to the contact-lever 10 serves also as an auxiliary driving force operating on the return movement of the polarized armature and can be regulated by a slider 21 or other suitable means.

It is sometimes advantageous to place an iron core 17 in the field of the main current of the meter, which core when there is no current passing tends to hold the lever-armature arm 3, and thus prevents registration of the meter; but when current is passing through the main coil 7 this core becomes polarized and repels the arm 3 in consequence of its similar polarization.

Instead of connecting the relay to the potential circuit of the meter it may be excited by a separate circuit.

Fig. 5 is a diagrammatic view of the arrangement of the shunt-coil 5 and relay 8, showing a resistance 25, which is connected in series with the potential coil 5 to enable it to be placed across the supply-mains.

According to a modification of this invention shown in Figs. 3 and 4, in which the exciting-coil 5 also operates as an electromagnetic relay, I divide the fixed tubular iron core 6 into two parts near its lower end and unite the separated part 19, which is free to move, to the body of the core by a spring 26. I provide a lever 20, pivoted at 27, on the bottom of the electromagnet, so that the end of one of its arms projects just beneath the separated part 19 of the core. This lever extends upwardly, with the extremity 9 of its other arm projecting over the top of the solenoid. This extremity forms or is provided with a contact-piece, and the lever is connected to one of the wires of the solenoid, the other wire being connected to a contact-arm 10, attached to the polarized armature. During the deflection period of the polarized armature the solenoid 5 attracts the separated part 19 of the core against the force of the spring 26 and holds it out of contact with the end of the lever 20; but after a determined movement of the polarized armature the contact-arm 10 engages with the contact 9 on the lever 20, thereby completing a circuit of low resistance compared to that of the solenoid. The current in the solenoid is thus greatly reduced, and the separated part 19 thus freed from attraction is forced by the spring onto the end of the pivoted lever 20. The lever is therefore moved so as to return the polarized armature quickly to its initial position, the lever itself being taken out of contact with the arm 10 by a spring 28. The movement of the lever 20 is utilized to actuate a counting mechanism for effecting the meter registration. The to-and-fro movement, just described, of the polarized armature continues so long as the main current is flowing in the series coils 7 of the meter. Instead of a diamagnetic disk-brake, as shown in the first modification, an iron disk 18 is here used for damping the field of the electromagnet 5, taking the place of the field of the permanent magnet 15. (Shown in Fig. 1.)

In the meter illustrated in Fig. 6 the main current-coils 7 and the shunt-coils 5 are interchanged, the former being utilized for polarizing the armature 2 3.

In the modification of my invention illustrated in Figs. 7 and 9 the shunt-winding 5 constitutes the movable armature and is attached to the sleeve 4, which surrounds the spindle 1, passing centrally through a fixed iron core 6. Current is led to the coil 5 by two spiral springs 11, and by the interaction of this current with the main current in the field-winding 7 movement of the coil 5 takes place round the core 6 in the direction of the arrows, the return movement of the coil being effected, as before, by the relay on the contact of the arms 9 and 10. The movement of the coil-armature, which is proportional to the energy consumption in the supply-circuit, is regulated by a retarding device, as in the forms of meter above described. The iron core 6 may be constructed of small dimensions and in special cases, as in alternating-current meters, may be laminated or dispensed with altogether.

Referring to Fig. 8, which represents an ampere-hour meter constructed in accordance with my invention, the armature is constructed of permanent magnets 2 3 or an ordinary magnet-needle, or I may employ soft-iron arms polarized by a fixed permanent magnet. The sleeve 4 in this case moves to and fro round the spindle 1, being coupled to and uncoupled from it in the manner already described.

It will be seen according to my invention that by dividing the moving system of a motor into a driving-armature periodically moved back by a special auxiliary force and a brake mass coupled with this driving-armature only during the forward or measuring movement the measuring system is freed from the work required for driving registering-gear, as well as that involved in overcoming friction of brushes and commutators, and by the employment of a driving-armature excited by fixed fields the consequent diminution of mass of the moving system which is effected reduces the frictional resistance.

My improved meters therefore differ essentially from those meters in which an armature is maintained in continuous rotation by a regular change of its polarity in having an armature which is always polarized in the same sense and cuts during the measuring period the field of magnetic lines of force in one direction only. In this way the brushes and commutators employed in ordinary continuously-rotating motor-meters are dispensed with, and the meter is freed from the disturbing effects resulting from such use.

By altering the angular position of the iron poles of the armature in my improved meters the proportionality may be regulated. It will, further, be seen that according to the arrangements which I have described above there results during the periodical turning back of the armature by means of the relay a whole or partial short-circuiting of the exciting-circuit of the armature, and the periodical weakening of the magnetization of the iron armature thereby caused serves for regulating the proportionality and for diminishing hysteresis.

In the modification of my invention in which the brake-disk is of magnetic material a further diminution of the friction is effected by counteracting the weight on the lower bearing of the brake-disk spindle by the upward electromagnetic attraction of the potential solenoid, or in cases in which a non-magnetic brake-disk is employed the same purpose may be effected by fitting the spindle with a piece of iron or steel, which is attracted by the solenoid.

I claim—

1. In an electric meter and in combination, a main circuit; an armature; a spindle extending through the same axially thereof constantly rotated forwardly, said spindle providing a journal upon which the armature oscillates; a drive connection between the armature and spindle; a contact member carried by the armature; and a relay for operating registering mechanism, including a contact part coacting with said contact member to close a circuit through the relay, whereby the latter is operated to check the forward movement of the armature and return the same to its starting position independently of said spindle, substantially as described.

2. In an electric meter and in combination, a main circuit; a coil in shunt therewith; a spindle extending axially through the coil carrying a brake-disk; a sleeve journaled upon the spindle within the shunt-coil; armature-arms projecting in diametrically opposite directions from the ends of said sleeve; a clutch interposed between the sleeve and spindle; relay mechanism including a movable resetting contact-arm; and a contact-arm carried by the sleeve coacting therewith, substantially as described.

3. In an electric meter and in combination, a main circuit; a coil having a tubular core; a spindle mounted to rotate extending through said core; a sleeve journaled upon the spindle within said core; armature-arms projecting in diametrically opposite directions from the ends of said sleeve; a clutch interposed between the sleeve and spindle; relay mechanism including a movable resetting contact-arm; and a contact-arm carried by the sleeve coacting therewith, substantially as described.

In witness whereof I have hereunto set my hand in presence of two witnesses.

MARTIN KALLMANN.

Witnesses:
 HANS HEIMANN,
 WOLDEMAR HAUPT.